/ˇ
3,591,545
FLAME-RETARDANT PAINT
Kay Ove Anderson, 7224 Verdugo Crestline,
Tujunga, Calif. 91042
No Drawing. Filed Sept. 11, 1968, Ser. No. 759,236
Int. Cl. C08f 45/04, 45/50; C09d 5/18
U.S. Cl. 260—30.6  2 Claims

ABSTRACT OF THE DISCLOSURE

A flame retarding paint composition suitable for outdoor or indoor use is formulated which may be applied in one step to provide a tough, durable coat and which is also resistant to weathering. The paint composition comprises a blend of vinyl chloride polymers, perchloroethylene, chlorinated hydrocarbons, alkyl aryl phosphate, asbestos, mica, antimony oxide-silicon dioxide mix, titanium dioxide, basic lead carbonate, barium phosphate, barium sulfate and mineral spirits.

---

The present invention relates to a paint composition suitable for either indoor or outdoor application to wood or other surfaces which is fire resistant and, in addition, resists weathering and forms a smooth, durable, easily applied coat.

Ordinarily resistance to fire and weathering is accomplished only by the separate application of materials in addition to the paint itself. For example, wood is often treated with a preservative such as creosote to increase resistance to rotting. Creosote, however, which is a distillate of coal tar produced by high temperature carbonization of bituminous coal and consists principally of liquid and solid hydrocarbons, is not a fire retardant material and is, in fact, quite flammable. Ordinary oil base paints, which are used for standard outdoor applications and which on oxidation provide a tough, durable coating contain unsaturated oils which are flammable. In order to provide a flameproof coat it has been necessary to apply separately to the surface being painted an additional fire retardant composition such as a solution of fire retardant salt. Examples of salts which have been applied for this purpose are ammonium sulfate, diammonium phosphate and zinc chloride.

Since each application of coating or impregnant in industrial operations involves additional expense, it is desirable to provide a single composition capable of being applied in a single operation to give a smooth, durable finish which is resistant to fire and weathering. It is therefore a principal object of the present invention to provide a paint composition which accomplishes these results.

In accordance with the present invention, it has been found that a flame retardant paint composition suitable for indoor or outdoor application, which provides a smooth, durable finish and which is resistant to weathering is produced from a formulation containing, on the basis of one gallon of final paint composition:

(1) about 64 to 140 ounces by weight of perchloroethylene;
(2) about 24 to 40 ounces by weight of a chlorinated hydrocarbon containing 7 to 11 carbon atoms and 55 to 77 percent chlorine;
(3) about 7 to 9 ounces by weight of a polyvinyl chloride homopolymer having a specific viscosity of 0.53;
(4) about 4 to 5 ounces by weight of a polymer mixture prepared by dissolving about 16 ounces by weight of said high molecular weight polyvinyl chloride resin having a specific gravity of 1.40 and a specific viscosity of 0.53 and 12 ounces by weight of liquid low molecular weight polyvinyl chloride in 44 fluid ounces of perchloroethylene;
(5) about one-half to one ounce by weight of an alkyl, aryl phosphate;
(6) about 20 to 24 ounces by weight of finely ground asbestos;
(7) about 3 to 7 ounces by weight of finely ground mica;
(8) about 1½ to 2½ ounces by weight of a mixture containing antimony oxide and silicon dioxide in a 1:1 mole ratio;
(9) about 30 to 35 ounces by weight of titanium dioxide;
(10) about 4 to 7 ounces by weight of basic lead carbonate;
(11) about 4 to 11 ounces by weight of barium phosphate;
(12) about 4 to 8 ounces by weight of barium sulphate;
(13) about 30 to 40 liquid ounces of commercial grade mineral spirits.

In addition to the above ingredients, if color is desired, any of the non-flammable inorganic pigments, e.g., chrome green, red lead, iron oxide, can be added. In addition, small amounts of standard insect repellants, e.g. 1, 1-bis(p-chloro-phenyl)-2,2,2-trichloroethane (DDT) or chlordan may also be added.

Advantageously, also a primer coat, having the following formulation; may be first applied to the surface to be painted and allowed to dry before applying the composition of this invention:

5.5–6.5 pounds of above paint composition of this invention
12–16 ounces of the above disclosed polymer mixture (item 4)
16–20 fluid ounces of perchloroethylene
.25–.75 ounces of alkyl-aryl phosphate
12–16 ounces of barium sulfate
3—5 ounces of finely ground asbestos The paint composition of this invention was formulated as follows:

(1) 108 ounces by weight of perchloroethylene;
(2) 32 ounces by weight of chlorinated hydrocarbons;
(3) 8 ounces by weight of polyvinyl chloride;
(4) 4 ounces of the polymer mixture disclosed above (item 4);
(5) ½ ounce of alkyl, aryl phosphate;
(6) 22 ounces of finely ground asbestos;
(7) 4 ounces of finely ground mica;
(8) 2 ounces of an antimony oxide-silicon dioxide mix;
(9) 32 ounces of titanium dioxide ($TiO_2$);
(10) 4 ounces of basic lead carbonate;
(11) 4 ounces of barium phosphate;
(12) 7 ounces of barium sulfate; and
(13) 32 fluid ounces of mineral spirits.

This paint composition was applied to a wood surface and allowed to dry. It was then subjected to the action of flames for a period of 10 minutes and found to resist the flames, i.e., there was no spreading of the flames. Additional wood panels, made up in the same manner using the same paint composition of this invention were also soaked in water for 30 days, after which they were dried and subjected to the intense heat of an acetylene torch for 6 minutes. There was no flame spread, and the residual flame was out within 4 seconds after the torch had been removed.

I claim:
1. A flame-retardant paint composition consisting essentially of:
about 64 to 140 ounces by weight of perchloroethylene;
about 24 to 40 ounces by weight of a chlorinated hy- drocarbon containing 7 to 11 carbon atoms and 55 to 77 percent chlorine;

about 7 to 9 ounces by weight of a high molecular weight polyvinyl chloride homopolymer having a specific viscosity of 0.53;

about 4 to 5 ounces by weight of a polymer mixture prepared by dissolving about 16 ounces by weight of said high molecular weight polyvinyl chloride homopolymer having a specific gravity of 1.40 and a specific viscosity of 0.53 and 12 ounces by weight of liquid low molecular weight polyvinyl chloride in 44 fluid ounces of perchloroethylene;

about one-half to one ounce by weight of an alkyl, aryl phosphate;

about 20 to 24 ounces by weight of finely ground asbestos;

about 3 to 7 ounces by weight of finely ground mica;

about 1½ to 2½ ounces by weight of a mixture containing antimony oxide and silicon dioxide in a 1:1 mole ratio;

about 30 to 35 ounces by weight of titanium dioxide;

about 4 to 7 ounces by weight of basic lead carbonate;

about 4 to 11 ounces by weight of barium phosphate;

about 4 to 8 ounces by weight of barium sulphate; and about 30 to 40 fluid ounces of commercial grade mineral spirits formulated together to give one gallon of final paint composition.

2. The flame-retardant composition of claim 1 which consists essentially of:

108 ounces by weight of perchloroethylene;
32 ounces by weight of chlorinated hydrocarbons;
8 ounces by weight of polyvinyl chloride;
4 ounces of polymer mixture;
½ ounce of alkyl, aryl phosphate;
22 ounces of finely ground asbestos;
4 ounces of finely ground mica;
2 ounces of an antimony oxide-silicon dioxide mix;
32 ounces of titanium dioxide ($TiO_2$);
4 ounces of basic lead carbonate;
4 ounces of barium phosphate;
7 ounces of barium sulfate; and
32 fluid ounces of mineral spirits.

References Cited

Advances in Chemistry Series 9th, Fire Retardant Paints, June 1954, 37, 39, 44 and 85–87, TP 936. A5.

MORRIS LIEBMAN, Primary Examiner

J. H. DERRINGTON, Assistant Examiner

U.S. Cl. X.R.

106—15; 260—33.6, 33.8, 41